(12) United States Patent
Centonza

(10) Patent No.: US 9,277,456 B2
(45) Date of Patent: Mar. 1, 2016

(54) GATEWAY DEVICE FOR HANDLING UE CONTEXT AND A METHOD THEREOF

(75) Inventor: Angelo Centonza, Winchester (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 117 days.

(21) Appl. No.: 14/239,467

(22) PCT Filed: Nov. 22, 2011

(86) PCT No.: PCT/SE2011/051403
§ 371 (c)(1),
(2), (4) Date: Feb. 18, 2014

(87) PCT Pub. No.: WO2013/028114
PCT Pub. Date: Feb. 28, 2013

(65) Prior Publication Data
US 2014/0192782 A1    Jul. 10, 2014

Related U.S. Application Data

(60) Provisional application No. 61/526,848, filed on Aug. 24, 2011.

(51) Int. Cl.
*H04W 4/00* (2009.01)
*H04W 36/00* (2009.01)
*H04W 76/04* (2009.01)
*H04W 88/16* (2009.01)
*H04W 92/04* (2009.01)
*H04W 92/20* (2009.01)

(52) U.S. Cl.
CPC ...... *H04W 36/0005* (2013.01); *H04W 36/0011* (2013.01); *H04W 76/041* (2013.01); *H04W 88/16* (2013.01); *H04W 92/045* (2013.01); *H04W 92/20* (2013.01)

(58) Field of Classification Search
None
See application file for complete search history.

(56) References Cited

U.S. PATENT DOCUMENTS

2009/0168722 A1* 7/2009 Saifullah et al. ............ 370/331
2011/0223919 A1* 9/2011 Vikberg et al. ............ 455/436

(Continued)

OTHER PUBLICATIONS

LTE; Evolved Universal Terrestrial Radio Access (E-UTRA) and Evolved Universal Terrestrial Radio Access Network (E-UTRAN); Overall description; Stage 2 (3GPP TS 36.300 version 10.4.0 Release 10), Technical Specification, European Telecommunications Standards Institute (ETSI), 650, Route Des Lucioles ; F-06921 Sophia-Antipolis ; France, vol. 3GPP RAN 2, No. V10.4.0, Jun. 1, 2011, XP014066386, cited in the application consisting of 194-pages.

(Continued)

*Primary Examiner* — Minh-Trang Nguyen
(74) *Attorney, Agent, or Firm* — Christopher & Weisberg, P.A.

(57) ABSTRACT

The technology described herein relates to a method in a gateway device and a gateway device for handling a context of a UE moving from a source HeNB (220) to a target HeNB. The gateway device is configured to receive a path switch request message from the source HeNB including a first pair of IDs and the gateway device is configured to transmit a second path switch request message to an MME including a second pair of IDs associated to the first pair of IDs. When the gateway device receives a UE context release request message from the source HeNB, the gateway device determines whether IDs in this message are associated to the same second pair of IDs. If this is the case, the gateway device maintains the UE context otherwise the gateway device releases or de-allocates the UE context.

11 Claims, 6 Drawing Sheets

(56) References Cited

U.S. PATENT DOCUMENTS

2011/0269465 A1* 11/2011 Xu et al. .................. 455/436
2014/0010204 A1* 1/2014 Xu et al. .................. 370/331

OTHER PUBLICATIONS

ZTE: "Optimization for UE context release in HeNB GW", 3GPP Draft; R3-112124, 3rd Generation Partnership Project (3GPP), Mobile Competence Centre ; 650, Route Des Lucioles ; F-06921 Sophia-Antipolis Cedex ; France, vol. RAN WG3, no. Athens, Greece; Aug. 22, 2011, Sep. 9, 2011, XP050541749, [retrieved on Sep. 9, 2011] cited in the application consisting of 3-pages.

International Search Report and Written Opinion dated Jul. 23, 2012 for International Application Serial No. PCT/SE2011/051403, International Filing Date: Nov. 22, 2011 consisting of 10-pages.

* cited by examiner

GATEWAY DEVICE FOR HANDLING UE CONTEXT AND A METHOD THEREOF

TECHNICAL FIELD

The technology described herein relates to a radio communications, and in particular a method and a gateway device for handling a context of a user equipment in radio communications that involve home base stations.

INTRODUCTION

The use of mobile broadband services using cellular networks has significantly increased during the latest years. In parallel to this, third generation (3G) and fourth generation (4G) cellular networks like high speed packet access (HSPA)/long term evolution (LTE)/WiMAX continued to evolve in order to support ever increasing performance with regards to capacity, peak bit rates, and coverage. Operators deploying these networks are faced with a number of challenges, e.g., related to site and transport costs and availability, lack of wireless spectrum, etc. The question is how best to meet these challenges and provide cost-efficient mobile broadband.

One option is to deploy home base stations such as home evolved nodeBs (HeNBs) in LTE, home nodeBs (HNB) in HSPA, femto base stations, a name used by femtoforum.org, or other small base stations complementing the traditional macro cellular network. Possible benefits of these small base stations are lower site costs due to smaller physical size and lower output power as well as increased capacity and coverage due to the closer deployment to the end user. The number of deployed home base stations may ultimately be very large, and there is some concern that home base stations may be less reliable than traditional macro base stations.

An operator can configure coverage cells as: Open, Hybrid or Closed. Open cells are open for use by all subscribers with no preference to perform cell reselection to specific individual cells. Closed cells broadcast a Closed Subscriber Group (CSG) cell type, called a CSG Indication, that can either indicate values "true" or "false" and identity, called CSG-ID that is a 27-bit identifier. A closed cell is only available to mobile radio terminals or user equipments (UEs) that belong to the CSG associated with that closed cell. When a cell is closed, a CSG Indication value of "true" is broadcasted by that cell's base station. Hybrid cells broadcast a CSG identity with a value "false." As a result, hybrid cells are available for all UEs. In addition, UEs belonging to the CSG have a preference for selecting CSG cells with the same CSG identity.

Home base stations may connect to the core network (CN) via a home base station gateway (H(e)NB GW). By HeNB GW is also meant a gateway device. A HeNB GW "hides" the home base station from the rest of the network. In an LTE/SAE-based system, where SAE stands for system architecture evolution, a HeNB GW is optional, and therefore, the HeNB GW communicates with other nodes such as MME/S-GW using an interface called the S1-interface. FIG. 1 illustrates such a network scenario 100. MME/S-GW 110 is a mobility management entity/serving-gateway. For the rest of the network, the HeNB GW 140 just looks like a large eNB with many cells. From the HeNB 130 point of view, the HeNB GW 140 looks like a CN node (e.g., an LTE MME node 110). The HeNB 130 only connects to one HeNB GW 140 and does not have network node selection functionality to connect to multiple HeNB GW nodes. Instead, the HeNB GW 140 supports network node selection functionality enabling support for MME-pools. If the HeNB 130 connects directly to the CN, then that directly-connected HeNB supports the network node selection functionality. FIG. 1 also shows eNBs 120 connected to each other via an interface known as the LTE X2-interface. eNBs may also connect to MME/S-GW 110 via the S1-interface as does the HeNB GW 140. The HeNB 130 is also shown connected to MME/S-GW 110 via the S1-interface.

As disclosed above, in HeNB deployments, HeNBs may communicate with each other via the (LTE) X2 interface. This means that X2 mobility is possible between peer HeNBs without any mobility signaling passing through the HeNB GW. The X2 interface as well as functionality of HeNBs and the network architecture with deployed HeNB GW shown in FIG. 1 are described in the standard third generation partnership project technical specification 3GPP TS36.300 entitled: "*Evolved Universal Terrestrial Radio Access (E-UTRA) and Evolved Universal Terrestrial Radio Access Network (E-UTRAN); Overall description*".

A UE connected to a HeNB may move and/or be handed over to another HeNB. As each HeNB is connected to a HeNB GW, a UE served by a HeNB has its UE context stored in the HeNB GW. When the UE moves to another HeNB, it is important that UE context assigned to the UE be de-allocated at the HeNB GW in case the UE moves out of the HeNB GW domain.

One important aspect of UE context de-allocation is the de-allocation of a MME S1 Application Protocol UE Identifier denoted MME S1AP UE ID defined in 3GPP TS 36.413 entitled: "*Evolved Universal Terrestrial Radio Access Network (E-UTRAN)*; S1 *Application Protocol (S1AP)*". MME S1AP UE ID uniquely identifies the UE on a S1-MME interface in the MME. For UE-associated S1 signaling between a HeNB and a HeNB GW, the MME S1AP UE ID is assigned by the HeNB GW. Failure to de-allocate MME S1AP UE IDs when UEs move out of the HeNB GW domain means that the HeNB GW may run out of un-allocated MME S1AP UE IDs to assign to new UEs connecting to HeNBs under (or attached to) the HeNB GW domain.

At the same time, the UE context (including the associated MME S1AP UE ID) should not be de-allocated when a UE moves via X2 signaling between two HeNBs under the same HeNB GW i.e. if the HeNBs belong to the same HeNB GW domain. This is because if the UE context is removed, then the UE is automatically disconnected from the target HeNB served by the HeNB GW.

In order to inform the HeNB GW of the X2 mobility for a UE served by a HeNB under the HeNB GW domain, a handling of the S1: UE context release request procedure was agreed in a 3GPP radio access network task group denoted 3GPP TSG-RAN WG3 #72 and which is captured in the 3GPP TS 36.300 technical specification. The following is stated: "The HeNB GW hosts the following functions: Relaying UE-associated S1 application part messages between the MME serving the UE and the HeNB serving the UE, except the UE CONTEXT RELEASE REQUEST message received from the HeNB with an explicit GW Context Release Indication. In that case, the HeNB GW terminates the S1 UE Context Release Request procedure."

The above quoted text indicates that once a UE performs an X2 handover from a source HeNB to a target HeNB, the source HeNB must send a UE CONTEXT RELEASE REQUEST message to the HeNB GW. The HeNB GW will not forward this message to the MME, as it normally would for all other UE-associated S1AP signaling messages, but instead terminates that message with the understanding that the HeNB GW needs to de-allocate the UE context relative to the UE handed over.

However, a problem with the above solution is that the HeNB GW does not know if the UE moved within its domain or not and therefore when the HeNB GW receives the UE context release request message, the HeNB GW shall not always release the UE context.

SUMMARY

An object according to the present embodiments is to alleviate at least some of the problems mentioned above. An object is therefore to provide a mechanism for ensuring that a UE context in a gateway device i.e. the HeNB GW, is de-allocated or released only in case where a UE is handed over from source radio base station i.e. a source HeNB to a target radio base station i.e. target HeNB outside the HeNB GW domain serving the source radio base station i.e. a target HeNB not attached to the HeNB GW.

Thus, according to an aspect of exemplary embodiments, at least some of the above stated problems are solved by means of a method in a gateway device (HeNB GW), for handling a context of a UE moving from a source radio base station to a target radio base station. The method comprising: receiving from the target radio base station (target HeNB), to which the UE moves to, a first path switch request message comprising a first pair of identities assigned for the UE by the target radio base station and the source radio base station, respectively, the source radio base station being the source HeNB that served the UE before the moving or handing over of the UE to the target radio base station. The first path switch request message further comprising an identity identifying a MME. The method further includes: transmitting to the MME, in response to receiving the first path switch request message, a second path switch request message comprising a second pair of identities identifying the UE in the MME and in the gateway device, respectively; the second pair of identities being associated to the first pair of identities. The method also comprises: receiving from the source radio base station a context release request message comprising a third pair of identities identifying the UE in the source radio base station and in the gateway device respectively; and determining whether the third pair of identities is associated to the same second pair of identities to which the first pair of identities is associated. If the third pair of identities are associated to the second pair of identities to which the first pair of identities is associated, maintaining the UE context. If the third pair of identities are not associated to the second pair of identities to which the first pair of identities is associated, one of releasing and de-allocating the UE context.

According to another aspect of exemplary embodiments, at least some of the above stated problems are solved by means of a gateway device i.e. a HeNB GW, for handling a context of a user equipment moving from a source radio base station to a target base station. The gateway device comprising a receiving circuit configured to receive from a target radio base station a first path switch request message comprising a first pair of identities assigned for the UE by the target radio base station and the source radio base station, respectively, the first path switch request message further comprising an identity identifying a mobility management entity, MME. The gateway device further comprising a transmitting circuit configured to transmit to the MME, in response to receiving the first path switch request message, a second path switch request message comprising a second pair of identities identifying the UE in the MME and in the gateway device, respectively; said second pair of identities being associated to the first pair of identities. The receiving circuit is further configured to receive from the source radio base station a context release request message comprising a third pair of identities identifying the UE in the source radio base station and in the gateway device, respectively; and the gateway device further comprises a processing circuit configured to determine whether the third pair of identities is associated to the same second pair of identities to which the first pair of identities is associated; if the third pair of identities is associated to the same second pair of identities to which the first pair of identities is associated, maintain the UE context, otherwise, to; and if the third pair of identities is not associated to the same second pair of identities to which the first pair of identities is associated, one of release and de-allocate the UE context.

Hence, if there is no association/coupling between the pairs of identities, the gateway device understands/determines that the UE is no longer served by a HeNB attached to the gateway device.

An advantage with the present embodiments is to efficiently handle a UE context of a UE in the gateway device.

Another advantage is to avoid disconnecting the UE from a radio base station served by the gateway device.

Yet another advantage is that the gateway device knows/determines whether to de-allocate the UE context using currently standardized procedures and the gateway device performs de-allocating appropriately and efficiently.

DETAILED DESCRIPTION

In the following, a detailed description of the exemplary embodiments is described in conjunction with the drawings, in scenarios to enable easier understanding the solution(s) described herein such as particular embodiments for purposes of explanation and not limitation. But it will be appreciated that other embodiments may be employed apart from these specific details. In some instances, detailed descriptions of well known methods, nodes, interfaces, circuits, and devices are omitted so as not obscure the description with unnecessary detail. Although the description is based on 3GPP LTE, the principle of the technology described may also be applied to other radio access technologies such as 3GPP WCDMA system, WiMAX etc.

Briefly described, the technology described herein provides a method in a gateway device and a gateway device for handling a context of a UE moving or that has moved from a source HeNB to a target HeNB in a communications network. It should be mentioned that not all details regarding the handover procedure are shown or illustrated so as not to obscure the description with unnecessary detail.

Figure 1:
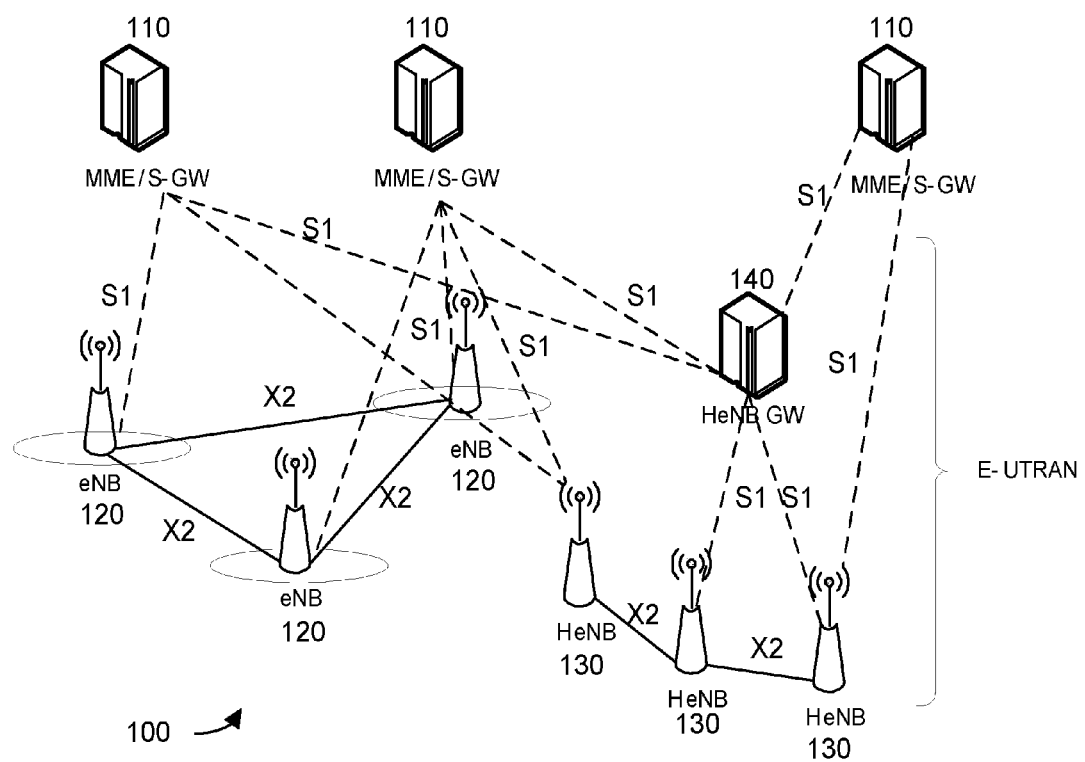
FIG. 1 illustrates a network architecture in LTE comprising HeNBs
Figure 2:
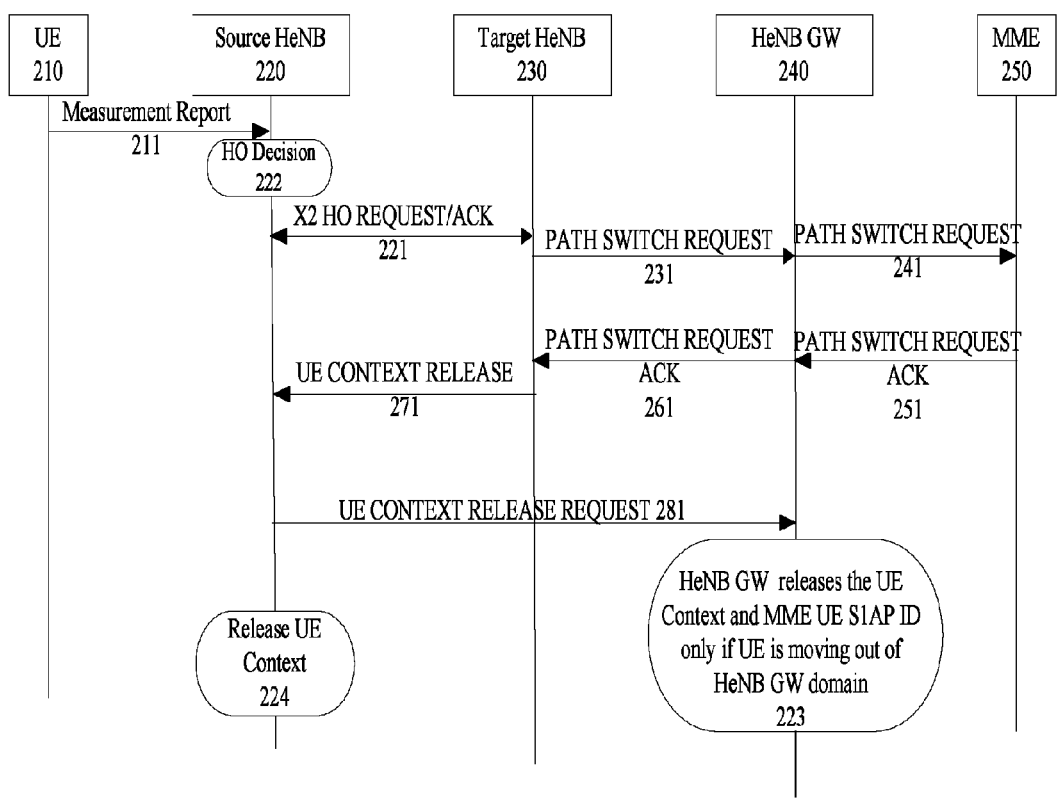
FIG. 2 illustrates a message sequence chart employing a UE context release procedure according to embodiments herein.

Referring to FIG. 2 there is illustrated a message sequence chart employing a UE context release procedure in a network scenario wherein a UE 210 moves from a source radio base station (HeNB1 220) to a target radio base station (HeNB2 230). A gateway device (i.e. HeNB GW 240) and a mobility management entity (MME 250) are also depicted. The HeNBs are connected through a X2 interface and they are connected to the HeNB GW via a S1 interface. The HeNB GW 240 and the MME 250 are connected via the S1 interface. It is here assumed that the context of the UE is previously stored in HeNB GW 240.

Before a handover (HO) decision is taken, the UE 210 sends measurement report(s) 211 to the source HeNB1 220 which makes the HO decision 222. The source HeNB1 220 sends a (X2) HO request to the target 221 HeNB2 230 which replies with a (X2) HO request acknowledgment ACK 221. Thereafter, the target HeNB2 230 transmits a first path switch request message 231 to the HeNB GW 240. The first path switch request message 231 comprises a first pair of identities MME UE S1AP ID-HeNB1 and eNB UE S1AP ID-HeNB2 and also comprises another identity which is of the source MME (GUMMEI: MME globally unique MME identity).

MME UE S1AP ID-HeNB1 is an identity assigned for the UE 210 by HeNB1 220 i.e. the source radio base station. eNB UE MME S1AP ID-HeNB2 is an identity assigned for the UE 210 by HeNB2 230. MME GUMMEI is the globally unique MME identity of MME 250.

In response to the received first path switch request message, HeNB GW 240 transmits (or forwards) to the MME 250 a path switch request message, hereinafter referred to as second path switch request message 241.

The second path switch request message 241 comprises a second pair of identities (IDs), MME UE S1AP ID-MME and eNB UE S1AP ID-HeNB GW assigned for the UE-associated S1 signalling over HeNB GW-MME signalling. MME UE S1AP ID-MME identifies the UE 210 in the MME 250 and eNB UE S1AP ID-HeNB GW identifies the UE 210 in the gateway device 240. The second pair of identities is (uniquely) associated to the first pair of identities. It should be mentioned that the first pair of IDs and the GUMMEI are uniquely associated to the pair of IDs for the UE signalling over S1 between HeNB GW 240 and MME 250.

The MME 250 then acknowledges, to the HeNB GW 240, the second path switch request message 241 in a path switch request ACK message 251 comprising the same second pair of IDs as in the second path switch request message 241. In response, the HeNB GW sends a path switch request ACK message 261 to the target HeNB2 230. In this message 261 the HeNB GW 240 includes MME UE S1AP ID-HeNB2 and eNB UE S1AP ID-HeNB2 assigned for the UE associated S1 signalling over the HeNBGW-HeNB2 signalling. Then the target HeNB2 230 sends a UE context release message 271 to the source HeNB1 220. In response, HeNB1 210 transmits a UE context release request message 281 to HeNB GW 240. This message 281 includes a third pair of IDs eNB UE S1AP ID-HeNB1 and MME UE S1AP ID-HeNB1, identifying the UE 210 in the source HeNB1 220 and in HeNB GW 240 respectively. The UE context release request message 281 further comprises an information element (IE), GW context release indication, which indicates to HeNB GW 240 that the X2 handover occurred from a source HeNB1 220 under its domain i.e. the source HeNB1 is attached to the gateway device. GW stands for gateway.

According to the present embodiments, the HeNB GW 240 when receiving the UE context release request message 281, is configured to determine/analyses whether the third pair of identities in this message 281 (i.e. eNB UE S1AP ID-HeNB1 and MME UE S1AP ID-HeNB1) is associated to the same second pair of identities (i.e. MME UE S1AP ID-MME and eNB UE S1AP ID-HeNB GW) to which the first pair of identities (i.e. MME UE S1AP ID-HeNB1 and eNB UE S1AP ID-HeNB2) is associated; that being the case, the HeNB GW 240 maintains the UE context of UE 210, otherwise, it releases or de-allocates the UE context.

According to an embodiment, if the ID identifying the UE in the gateway device 240 i.e. MME UE S1AP ID-HeNB GW is associated to both the first and third pair of IDs, HeNB GW 240 determines that the third pair of identities, in the UE context release request message, is associated with the same second pair of identities to which the first pair of identities is associated and therefore will not release the UE context otherwise, the HeNB GW 240 determines/understands that the target HeNB2 230 is not attached to it and releases the UE context.

According to an embodiment, if the ID identifying the UE in the MME 250 i.e. MME UE S1AP ID-MME is associated to both the first and third pair of IDs, HeNB GW 240 determines that the third pair of identities, in the UE context release request message, is associated with the same second pair of identities to which the first pair of identities is associated and therefore will not release the UE context otherwise, the HeNB GW 240 determines/understands that the target HeNB2 230 is not attached to it and releases the UE context.

In other words the source HeNB1 220 includes eNB UE S1AP ID and MME UE S1AP ID in a UE context release request message 281 to the HeNB GW 240 for analysis by the HeNB GW 240. This pair of IDs is uniquely coupled with another pair of similar IDs over the S1 interface between HeNB GW 240 and MME 250. The two pair of IDs are similar in the meaning that they identify a UE at the two terminations of each S1 interface, respectively, the S1 interface between HeNB1 and HeNB GW and the S1 interface between HeNB GW and MME. In other words, each pair of IDs comprises of an eNB UE S1AP ID and an MME UE S1IP ID, but each of the IDs uniquely identifies the UE at different nodes of the HeNB-HeNBGW-MME S1 interface route.

Because the UE 200 is handed over from the source HeNB 220 to a target HeNB 230, there are two more IDs sent in the (first) path switch request message from the target HeNB 230 to the HeNB GW 240: the eNB UE S1AP ID and source MME UE S1AP ID in addition to the source MME GUMMEI. These IDs and the GUMMEI are also uniquely associated to the pair of IDs for the UE signaling over S1 between HeNB GW 240 and MME 250.

As a result, the HeNB GW 240, when receiving the UE context release request message sent from the source HeNB 220 and containing the pair of IDs relative to S1 signaling between source HeNB 220 and HeNB GW 240, knows that these IDs are coupled with the S1AP IDs between HeNB GW 240 and MME 250. The HeNB GW 240 receives the (first) path switch request message from the target HeNB 230 and the S1AP IDs and source MME GUMMEI contained in this message which are paired with the same S1AP IDs between HeNB GW 240 and MME 250. Therefore, the HeNB GW 240 understands that the UE 210 is still connected to a HeNB under its domain and it will not release the UE context. But if the HeNB GW 240 does not receive a path switch message with S1IP IDs and source MME GUMMEI associated with the S1AP IDs between HeNB GW 240 and MME 250, then the HeNB GW 240 knows that the UE 210 has moved out of its domain and de-allocates the UE Context.

Hence, only if the association is present as described above, the UE 210 has performed an intra-HeNB GW domain handover and the UE context is maintained in the gateway device i.e. HeNB GW 240 discards the UE context release request message received from the source HeNB 220.

Thus, for intra-HeNB GW domain handovers, the HeNB GW 240 monitors whether the pair of IDs received in the UE context release request message (i.e. the third pair of IDs) is coupled with the pair MME UE S1AP ID-MME, eNB UE S1AP ID-HeNB GW (i.e. the second pair of IDs) for which the pair of IDs contained in the path switch request message (i.e. the first pair of IDs) are also coupled. If this condition holds, then the UE context does not need to be released thereby avoiding disconnecting the UE from the target HeNB served by the gateway device.

But if the pair of IDs received in the UE context release request message is not coupled with the pair (MME UE S1AP ID-MME, eNB UE S1AP ID-HeNB GW) coupled with any pair of IDs+source MME GUMMEI contained in previously received path switch request message, then the UE has moved out of the HeNB GW domain, and the UE context (including all S1 AP IDs) may be de-allocated. This leads to efficient handling of the UE context. FIG. 2 illustrates in step 223 that HeNB GW needs to release the UE context and MME UE S1AP ID only if UE is moving out of the HeNB GW domain. In step 224 the UE context is release in the source HeNB 220.

It should be mentioned that messages/signalling involved in the UE context release procedure described above are currently standardized and therefore an advantage with the embodiments described herein is that no new signalling is required for enabling the gateway device according to the embodiments to perform the de-allocation of the UE context device appropriately and efficiently.

Figure 3:
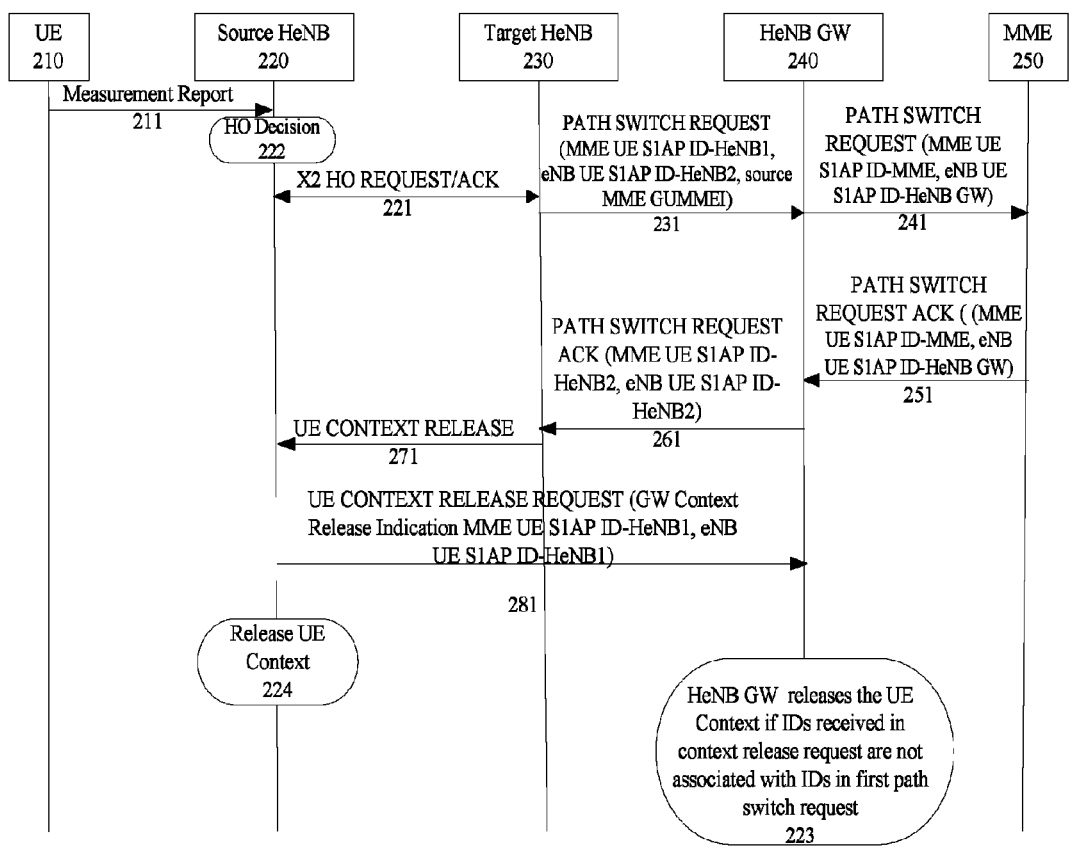
FIG. 3 illustrates the signaling scheme sequence according to of FIG. 2 with additional details.

FIG. 3 illustrates the signaling scheme sequence as shown in FIG. 2 but with additional details in which assigned IDs are indicated. As shown, the HeNB GW 240 only releases UE context if IDs received in the UE context release request message are not associated with IDs+MME GUMMEI in the first path switch request message transmitted from target HeNB2 230 to HeNB GW 240 as previously described.

Figure 4:
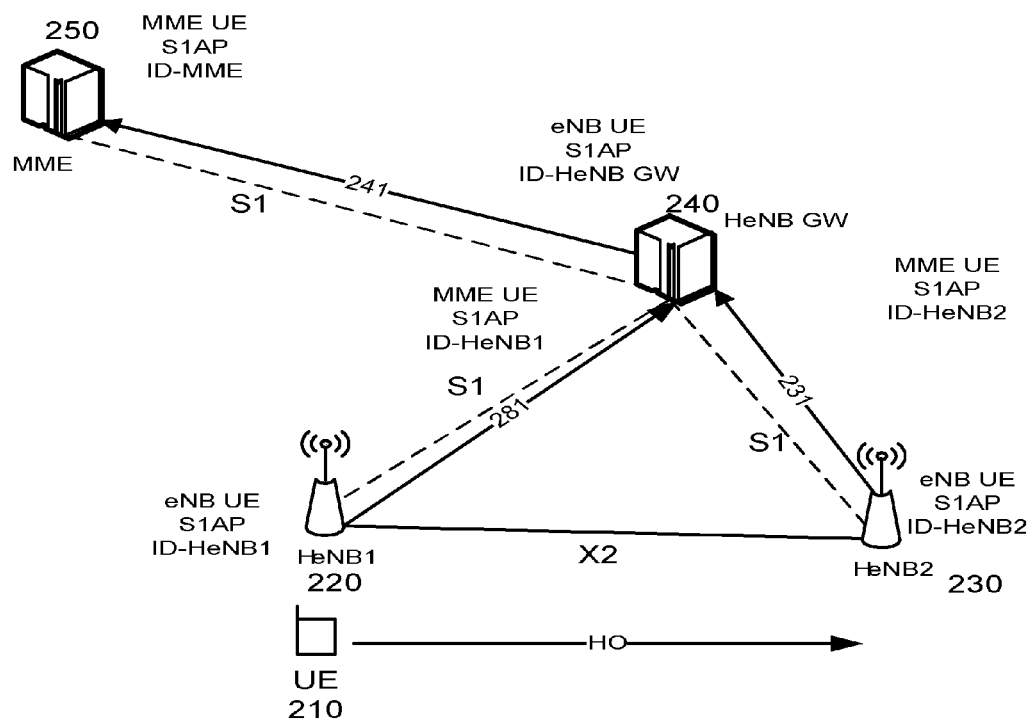
FIG. 4 illustrates a network architecture depicting assignment or allocation of S1AP IDs.

FIG. 4 illustrates how the S1AP IDs described earlier are assigned/allocated. The following S1AP IDs are indicated: MME UE S1AP ID-MME assigned by the MME 250 for HeNB GW UE-associated S1 signalling; eNB UE S1AP ID-HeNB GW assigned by the HeNB GW 240 for MME-HeNB GW UE associated S1 signalling; MME UE S1AP ID-HeNB1 assigned by HeNB GW 240 for HeNB1-HeNB GW UE-associated S1 signalling; eNB UE S1AP ID HeNB1 assigned by HeNB1 220 for HeNB1-HeNB GW UE-associated S1 signalling; MME UE S1AP ID-HeNB2 assigned by HeNB GW 240 for HeNB2-HeNB GW UE-associated S1 signalling; eNB UE S1AP ID HeNB2 assigned by HeNB2 230 for HeNB2-HeNB GW UE-associated S1 signalling. FIG. 4 also depicts that the UE 210 is handed over from HeNB1 220 to HeNB2 230 and also depicts the first path switch request message 231 from HeNB2 230 to HeNB GW 240, UE context release request message 281 from HeNB1 220 to HeNB GW 240 and the second path switch request message 241 from HeNB GW 240 to MME 250. These messages 231, 281 and 241 have already been described in relation to FIGS. 2 and 3.

Also described earlier is that the ID pair in the second path switch request message 241 (MME UE S1AP ID-MME, eNB UE S1AP ID-HeNB GW) assigned for UE-associated S1 signaling over HeNB GW-MME signaling is uniquely associated to the ID pair (MME UE S1AP ID-HeNB1, eNB UE S1AP ID-HeNB2) contained in the first path switch request message 231 and to the pair (MME UE S1AP ID-HeNB1, eNB UE S1AP ID-HeNB1) in UE context release request message 281.

The first path switch request message from the target HeNB2 to the HeNB GW also includes the source MME GUMMEI. The UE context release request message from the source HeNB1 contains as described the ID pair (MME UE S1AP ID-HeNB1, eNB UE S1AP ID-HeNB1). The gateway device analyses the received S1AP IDs and releases the UE context if it determines that the UE identified by the received S1AP IDs is no longer served by the (target) HeNB attached to the gateway device. As described, the gateway device determines if association is present or not to make a decision on the release or the keeping of the UE context in the gateway device.

Figure 5:
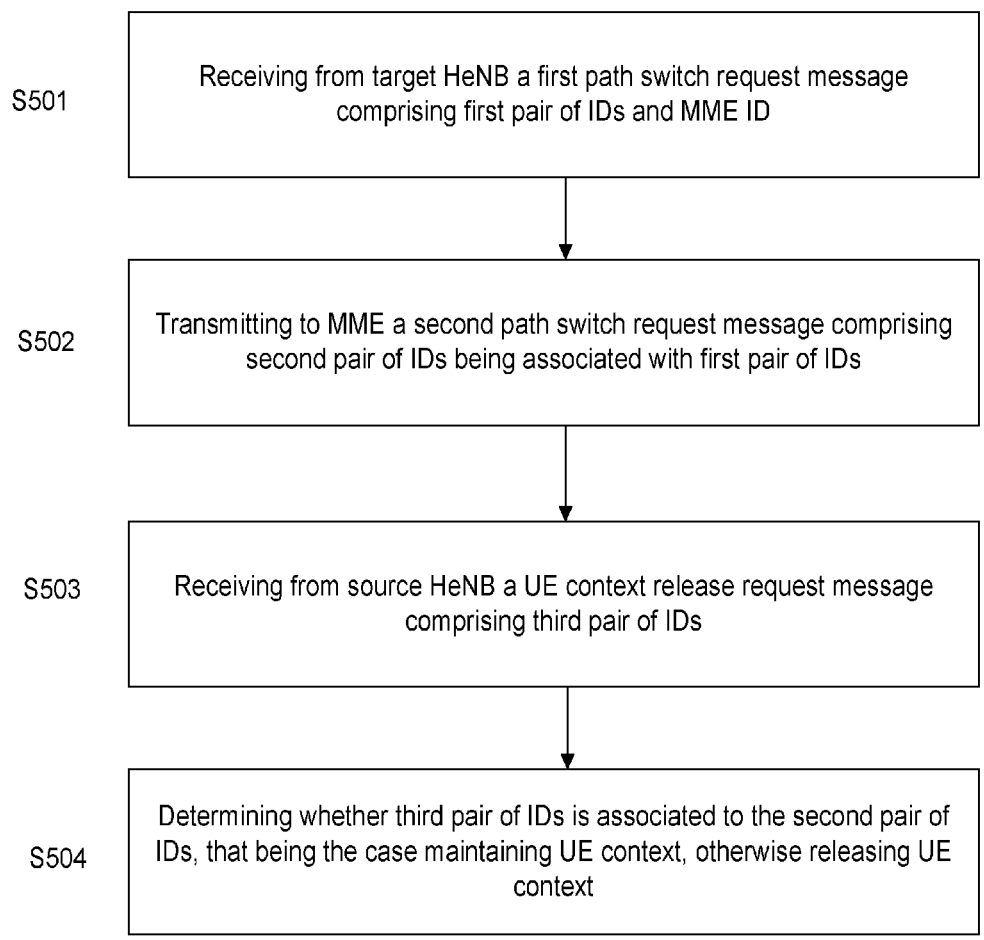
FIG. 5 is a flowchart illustrating main method steps performed by a gateway device according to the present embodiments.

FIG. 5 illustrates a flowchart depicting main method steps performed by a gateway device (i.e. HeNB GW) according to the described embodiments, for handling a UE context of a UE moving or that has moved or handed over from a source radio base station (i.e. source HeNB) to a target radio base station (i.e. a target HeNB). As shown, the method comprises:

S501: receiving from target HeNB a first path switch request message comprising a first pair of identities assigned for the UE by the target HeNB respectively the source HeNB, the first path switch request message further comprising an identity identifying an MME.

S502: transmitting to the MME, in response to receiving the first path switch request message, a second path switch request message comprising a second pair of identities identifying the UE in the MME and in the HeNB GW respectively; said second pair of identities being associated to the first pair of identities;

S503: receiving from the source HeNB a UE context release request message comprising a third pair of identities identifying the UE in the source HeNB and in the HeNB GW respectively; and S504: determining whether the third pair of identities is associated to the same second pair of identities to which the first pair of identities is associated; that being the case maintaining the UE context, otherwise, releasing or de-allocating the UE context.

Additional details on the procedure performed by the gateway device have already been described and are not unnecessarily repeated.

It should be mentioned that in 3GPP contributions numbered R3-112124, R3-112125, R3-112126, R3-112127 and in R3-112104 available at http://www.3gpp.org/ftp/tsg_ran/WG2_RL2/TSGR3__73/Docs and submitted to the 3GPP meeting RAN3 #73, (the contents of which are incorporated herein by reference), the problem of how to ensure that a UE context is not de-allocated if a UE moves to a HeNB within the HeNB GW domain is addressed and possible solutions suggested. However, none of the suggested solutions fully address the problem.

For example, the 3GPP proposal R3-112104 proposes that "the HeNB GW terminates the S1 UE Context Release Request procedure and releases the UE context only if the last path switch request message received was from the same HeNB that sent the UE context release request. Otherwise it discards the message." But this proposal does not address the scenario where a UE powers up in a HeNB1 and hands over via X2 to HeNB2 (HeNB1 and HeNB2 are connected to the same HeNB GW). In this scenario, there is no path switch request message sent before the UE context release request from HeNB1 reaches the HeNB GW.

Another proposal, 3GPP, R3-112124 proposes that the path switch request message sent from the target HeNB2 contain the GUMMEI and the MME UE S1AP ID assigned to the UE when in the source HeNB1 cell. With this information, the HeNB GW may understand if the UE was connected to a HeNB under its domain when in the source HeNB1 cell.

However, this solution does not allow the HeNB GW to know whether the UE context must be released when the UE context release request message is received from the source HeNB1.

Hence none of the above proposals describes a solution according to the described embodiments that allow and ensures that a UE context in the HeNB GW is de-allocated only in case where the UE hands over to a HeNB outside the HeNB GW domain serving the source HeNB.

As previously described, in the UE context release request message sent from the source radio base station or source HeNB to the gateway device or HeNB GW includes an information element (IE); GW context release indication; which indicates to the HeNB GW that the X2 handover occurred from a HeNB under the domain of HeNB GW. The HeNB GW receiving such message with such IE should de-allocate the UE context only if the UE moves to a HeNB not connected to the HeNB GW as explained earlier. According to current specifications and during X2 mobility, the source HeNB connected to a HeNB GW needs to always send the GW context release indication IE in the UE context release request message. As a consequence the HeNB GW will need to assess whether the UE context needs to be released or not as previously described. However, if the source HeNB could determine that the X2 mobility is towards a target HeNB under the same HeNB GW, the source HeNB could avoid including the GW context release indication IE in the UE context release request message. If the indication IE is not received by the HeNB GW, the release of the UE context is not necessary because the HeNB GW does not have to perform a check on whether to release the UE context or not.

In order to limit the number of times the GW context release indication IE is included in the UE context release request, the source HeNB may check/control/determine if a tracking area identifier (TAI) of the target HeNB cell is the same as the TAI of the source HeNB cell and further check/control/determine that the target HeNB is an HeNB, which is known by the source HeNB during setup of the X2 interface with the target HeNB. The latter control may be performed by determining or checking that a global eNB ID information element (IE) follows the format of an HeNB ID. If this is the case and due to that a TAI cannot be assigned to multiple HeNB GWs, the source HeNB can determine/understand that X2 mobility towards the target HeNB cell is within the same HeNB GW domain. Consequently, at the next instance of X2 mobility between the same source HeNB cell and target HeNB cell, source HeNB will not include the GW context release indication IE in the UE context release request or it will not send the UE context release request message at all and as a result the UE context does not need to be released in the HeNB GW.

Figure 6:
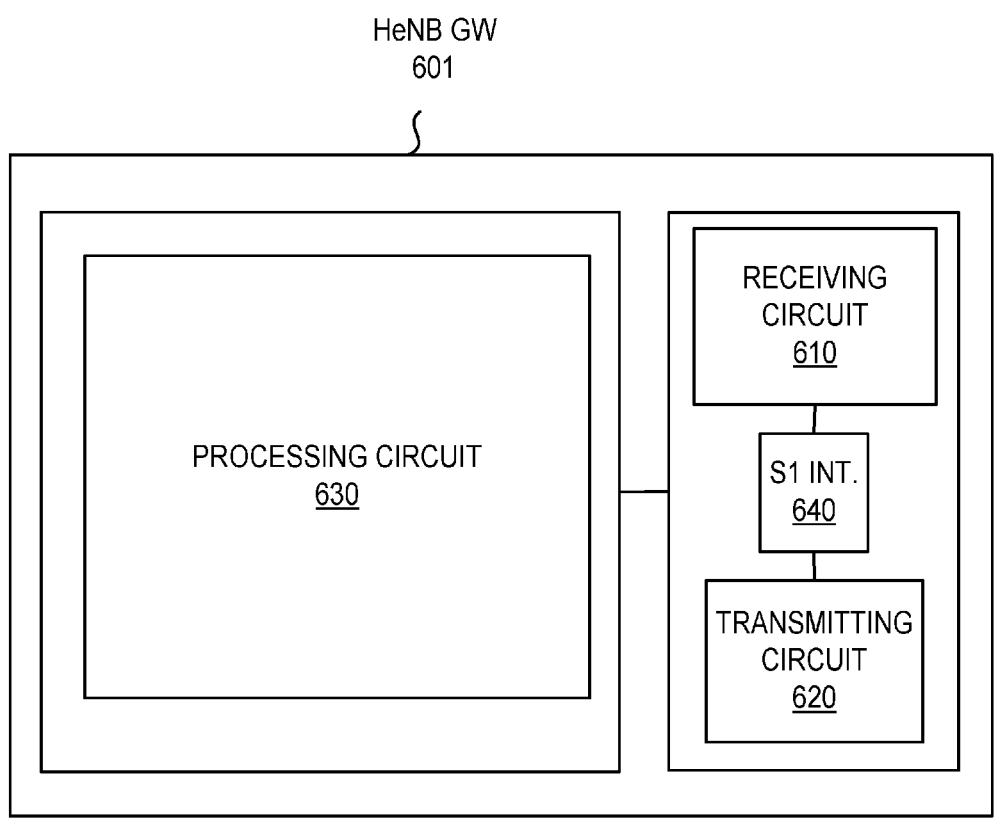
FIG. 6 is a block diagram illustrating an exemplary gateway device according to the present embodiments.

Referring now to FIG. 6, there is illustrated a block diagram of an exemplary gateway device (HeNB GW) 601 in accordance with the previously described embodiments. As shown, the gateway device 601 comprises a receiving circuit (or receiver) 610 configured to receive from a target radio base station (not shown) a first path switch request message comprising a first pair of identities assigned for the UE by the target radio base station respectively the source radio base station (not shown), the first path switch request message further comprising an identity identifying a MME (not shown). The gateway device 601 further comprises a transmitting circuit (or transmitter) 620 configured to transmit to the MME, in response to receiving the first path switch request message, a second path switch request message comprising a second pair of identities identifying the UE in the MME and in the gateway device 601 respectively; the second pair of identities being associated to the first pair of identities. The received circuit 610 is further configured to receive from a source radio base station a UE context release request message comprising a third pair of identities identifying the UE in the source radio base station and in the gateway device 601 respectively. The gateway device 601 further comprises a processing circuit (or processor) 630 configured to determine whether the third pair of identities is associated to the same second pair of identities to which the first pair of identities is associated; that being the case the processing circuit 630 is configured to maintain the UE context, otherwise, the processing circuit 630 is configured to release or de-allocate the UE context. The processing circuit 630 is further configured to determine that the third pair of identities is associated with the same second pair of identities to which the first pair of identities is associated if the identity identifying the UE in the gateway device is associated to both the first and third pair of identities, as previously described. If the identity identifying the UE in the MME is associated to both the first and third pair of identities, the processing circuit 630 is also configured to determine that the third pair of identities is associated with the same second pair of identities to which the first pair of identities is associated. The gateway device 601 also comprises circuitry of/for an S1 interface 640 shown here connected to the transmitting circuit 620 to the receiving circuit 610. Circuits 610 and 620 may be comprised in a single transceiver circuit (not shown) instead of being separated.

Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The present solution is not limited to the above described preferred embodiments. Various alternatives, modifications and equivalents may be used. Therefore, the above embodiments should not be taken as limiting the scope of the invention, which is defined by the appending claims.

The invention claimed is:

1. A method in a gateway device for handling a context of a user equipment (UE) moving from a source radio base station to a target radio base station, the method comprising:
   receiving from the target radio base station a first path switch request message comprising a first pair of identities assigned for the UE by the target radio base station and the source radio base station, respectively, the first path switch request message further comprising an identity identifying a mobility management entity, (MME);
   transmitting to the MME, in response to receiving the first path switch request message, a second path switch request message comprising a second pair of identities identifying the UE in the MME and in the gateway device, respectively, said second pair of identities being associated to the first pair of identities;
   receiving from the source radio base station a UE context release request message comprising a third pair of identities identifying the UE in the source radio base station and in the gateway device, respectively;
   determining whether the third pair of identities is associated to the same second pair of identities to which the first pair of identities is associated;
   if the third pair of identities are associated to the same second pair of identities to which the first pair of identities is associated, maintaining the UE context;
   if the third pair of identities are not associated to the same second pair of identities to which the first pair of identities is associated, one of releasing and de-allocating the UE context;
   if the third pair of identities is associated to the same second pair of identities to which the first pair of identities is associated, determining said UE performed an intra gateway device domain handover; and
   if the third pair of identities is not associated to the same second pair of identities to which the first pair of identities is associated, determining said UE has moved out of a domain of the gateway device.

2. The method of claim 1, wherein the third pair of identities is determined to be associated with the same second pair of identities to which the first pair of identities is associated if the identity identifying the UE in the gateway device is associated to both the first and third pair of identities.

3. The method of claim 1, wherein the third pair of identities is determined to be associated with the same second pair of identities to which the first pair of identities is associated if the identity identifying the UE in the MME is associated to both the first and third pair of identities.

4. A gateway device for handling a context of a user equipment (UE) moving from a source radio base station to a target radio base station, the gateway device comprising:
   a receiving circuit configured to receive from the target radio base station a first path switch request message comprising a first pair of identities assigned for the UE by the target radio base station and the source radio base station, respectively, the first path switch request message further comprising an identity identifying a mobility management entity (MME);
   a transmitting circuit configured to transmit to the MME, in response to receiving the first path switch request message, a second path switch request message comprising a second pair of identities identifying the UE in the MME and in the gateway device, respectively, said second pair of identities being associated to the first pair of identities;
   the receiving circuit is further configured to receive from the source radio base station a UE context release request message comprising a third pair of identities identifying the UE in the source radio base station and in the gateway device, respectively;
   a processing circuit configured to:
      determine whether the third pair of identities is associated to the same second pair of identities to which the first pair of identities is associated;
      if the third pair of identities is associated to the same second pair of identities to which the first pair of identities is associated, maintain the UE context;
      if the third pair of identities is not associated to the same second pair of identities to which the first pair of identities is associated, one of release and de-allocate the UE context;
      if the third pair of identities is associated to the same second pair of identities to which the first pair of identities is associated, determine the UE performed an intra gateway device domain handover; and
      if the third pair of identities is not associated to the same second pair of identities to which the first pair of identities is associated, determine the UE has moved out of a domain of the gateway device.

5. The gateway device of claim 4, wherein the processing circuit is configured to determine that the third pair of identities is associated with the same second pair of identities to which the first pair of identities is associated if the identity identifying the UE in the gateway device is associated to both the first and third pair of identities.

6. The gateway device claim 4, wherein the third pair of identities is determined to be associated with the same second pair of identities to which the first pair of identities is associated if the identity identifying the UE in the MME is associated to both the first and third pair of identities.

7. The gateway device of claim 4, wherein the gateway device is a home eNodeB gateway (HeNB GW).

8. The method of claim 2, wherein the third pair of identities is determined to be associated with the same second pair of identities to which the first pair of identities is associated if the identity identifying the UE in the MME is associated to both the first and third pair of identities.

9. The gateway device claim 5, wherein the third pair of identities is determined to be associated with the same second pair of identities to which the first pair of identities is associated if the identity identifying the UE in the MME is associated to both the first and third pair of identities.

10. The gateway device of claim 5, wherein the gateway device is a home eNodeB gateway (HeNB GW).

11. The gateway device of claim 6, wherein the gateway device is a home eNodeB gateway (HeNB GW).

* * * * *